(12) United States Patent
Yu et al.

(10) Patent No.: US 10,581,035 B2
(45) Date of Patent: Mar. 3, 2020

(54) SECONDARY BATTERY PACK (71) Applicant: LG CHEM, LTD., Seoul (KR)

(72) Inventors: Sung-Chun Yu, Daejeon (KR);
Do-Hyeon Kim, Daejeon (KR);
Jun-Yeob Seong, Daejeon (KR)

(73) Assignee: LG CHEM, LTD., Seoul (KR)

(*) Notice: Subject to any disclaimer, the term of this patent is extended or adjusted under 35 U.S.C. 154(b) by 134 days.

(21) Appl. No.: 15/570,824

(22) PCT Filed: Oct. 24, 2016

(86) PCT No.: PCT/KR2016/011980
§ 371 (c)(1),
(2) Date: Oct. 31, 2017

(87) PCT Pub. No.: WO2017/111280
PCT Pub. Date: Jun. 29, 2017

(65) Prior Publication Data
US 2018/0145289 A1 May 24, 2018

(30) Foreign Application Priority Data
Dec. 23, 2015 (KR) .................. 10-2015-0185200

(51) Int. Cl.
*H01M 2/06* (2006.01)
*H01M 2/04* (2006.01)
(Continued)

(52) U.S. Cl.
CPC .............. *H01M 2/06* (2013.01); *B60L 50/64* (2019.02); *H01M 2/04* (2013.01); *H01M 2/043* (2013.01);
(Continued)

(58) Field of Classification Search
None
See application file for complete search history.

(56) References Cited

U.S. PATENT DOCUMENTS 7,517,610 B2 * 4/2009 Popp .................. H01M 2/305
429/161
2012/0251851 A1 * 10/2012 Kim .................. H01M 2/043
429/61

(Continued)

FOREIGN PATENT DOCUMENTS

EP 0 228 983 A2 7/1987
EP 0606850 A2 * 7/1994 .............. H01M 2/34

(Continued)

OTHER PUBLICATIONS

English machine translation of EP-0606850-A2 (Year: 1994).*

(Continued)

*Primary Examiner* — Milton I Cano
*Assistant Examiner* — Mary G Henshaw
(74) *Attorney, Agent, or Firm* — Birch, Stewart, Kolasch & Birch, LLP (57) ABSTRACT

Provided is a secondary battery pack including: a cell assembly including a secondary battery, and a stacking frame supporting the secondary battery and stacked in a direction; a pack case having an internal space for accommodating the cell assembly, and having a through hole in internal and external directions; an electrode terminal electrically connected to the cell assembly and protruding to an outer part of the pack case by passing through the through hole; a bonding part filling a gap between the through hole and the electrode terminal in order to form an adhesive layer; and a bonding cover attached to the through hole of the pack case while surrounding a boundary of the electrode terminal above the bonding part.

16 Claims, 7 Drawing Sheets (51) Int. Cl.
  *H01M 2/10* (2006.01)
  *H01M 2/34* (2006.01)
  *H01M 2/30* (2006.01)
  *B60L 50/64* (2019.01)
  *H01M 2/08* (2006.01)

(52) U.S. Cl.
  CPC .............. *H01M 2/08* (2013.01); *H01M 2/10* (2013.01); *H01M 2/1072* (2013.01); *H01M 2/1077* (2013.01); *H01M 2/305* (2013.01); *H01M 2/347* (2013.01); *H01M 2220/20* (2013.01)

(56) References Cited

U.S. PATENT DOCUMENTS

| | | |
|---|---|---|
| 2015/0221911 A1 | 8/2015 | Kim et al. |
| 2016/0336577 A1 | 11/2016 | Eom et al. |
| 2016/0372736 A1 | 12/2016 | Kim et al. |

FOREIGN PATENT DOCUMENTS

| | | | | |
|---|---|---|---|---|
| GB | 1575280 A | * | 9/1980 | ............ H01M 2/06 |
| JP | 07-037560 A | | 2/1995 | |
| JP | 2002-289155 A | | 10/2002 | |
| JP | 2005-71847 A | | 3/2005 | |
| JP | 2012-79508 A | | 4/2012 | |
| JP | 2013-109974 A | | 6/2013 | |
| JP | 2014-060019 A | | 4/2014 | |
| JP | 2015-125799 A | | 7/2015 | |
| KR | 10-1987-0006680 A | | 7/1987 | |
| KR | 10-19990043226 | * | 6/1999 | |
| KR | 10-2015-0086925 A | | 7/2015 | |
| WO | WO 2014/039818 A1 | | 3/2014 | |
| WO | WO 2015/186911 A1 | | 10/2015 | |

OTHER PUBLICATIONS

English machine translation of KR19990043226A (Year: 1999).*
International Search Report for PCT/KR2016/011980 (PCT/ISA/210) dated Feb. 28, 2017.

* cited by examiner

SECONDARY BATTERY PACK

TECHNICAL FIELD

The present disclosure relates to a secondary battery pack including a plurality of secondary batteries, and more particularly, to a secondary battery pack configured to expose an electrode terminal to an outer part of a pack case and having a sealing unit on a corresponding part of the pack case.

The present application claims priority to Korean Patent Application No. 10-2015-0185200 filed on Dec. 23, 2015 in the Republic of Korea, the disclosure of which is incorporated herein by reference.

BACKGROUND ART

Recently, secondary batteries have been widely used in a medium and/or large-scale device such as a vehicle and a power storage device, as well as a small device such as a portable electronic device. In particular, since carbon-based energy is gradually depleted and concern about environment has been increasing, hybrid cars and electric vehicles are being highlighted worldwide including USA, Europe, Japan, and Korea.

In hybrid cars or electric vehicles, the most important component is a secondary battery pack providing a motor of a vehicle with a driving power. Since a driving power of a hybrid car or an electric vehicle is obtained through charging/discharging of a secondary battery pack, the hybrid car or the electric vehicle has various advantages in various aspects, for example, excellent mileage, no discharge of pollution materials, or reduction in discharge of pollution materials, and thus, people using the hybrid car or the electric vehicle have been increasing.

A secondary battery pack used in a hybrid car or an electric vehicle includes a plurality of secondary batteries, and the plurality of secondary batteries may be connected in series and/or in parallel with one another based on a required capacity and output. In addition, the secondary battery pack may further include a stacking frame for stacking the plurality of secondary batteries, a control device such as a BMS for controlling charging/discharging states of the secondary batteries, and a pack case configuring an outer appearance and protecting the above elements against outside.

In addition, an electrode terminal of the secondary battery pack may be electrically connected to a car driving motor via a high voltage cable, and generally the electrode terminal is exposed to an outer part of the pack case after passing through a terminal installation through hole provided in the pack case.

The pack case is required to have impact resistance, to block infiltration of impurities, and to have a predetermined level of water-resistant performance, and a space between the electrode terminal and the terminal installation through hole has to be sealed. To do this, secondary battery packs according to the related art generally use a gasket of a rubber material or an O-ring to seal between the electrode terminal and the terminal installation through hole.

However, according to the sealing structure using the O-ring as above, the O-ring may become limp when an internal pressure and an internal temperature in the secondary battery pack increase, and accordingly a leakage may occur around the terminal installation through hole. Also, the O-ring may not be completely adhered to an internal surface of the terminal installation through hole due to a dimensional error of the terminal installation through hole or an assembling error with respect to the electrode terminal during manufacturing the pack case. In this case, a sealing property between the terminal installation through hole of the pack case and the electrode terminal greatly degrades.

DISCLOSURE

Technical Problem

The present disclosure is designed to solve the problems of the related art, and therefore the present disclosure is directed to providing a secondary battery pack having an improved sealing property between a through hole of a pack case and an electrode terminal, when being compared with the related art.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a secondary battery pack including: a cell assembly including a secondary battery and a stacking frame supporting the secondary battery and stacked in a direction; a pack case having an internal space for accommodating the cell assembly, and having a through hole in internal and external directions; an electrode terminal electrically connected to the cell assembly and protruding to an outer part of the pack case by passing through the through hole; a bonding part filling a gap between the through hole and the electrode terminal to form an adhesive layer; and a bonding cover attached to the through hole of the pack case while surrounding a boundary of the electrode terminal above the bonding part.

The bonding cover may have a loop shape that is shrink-fitted to the electrode terminal.

The bonding cover may include an outer circumferential part closely contacting an upper surface of the pack case at an outer part of the through hole, and an inner circumferential part that is shrink-fitted to the electrode terminal to contact a boundary surface of the electrode terminal and bent downward with respect to the outer circumferential part to be inserted into the through hole.

The inner circumferential part of the bonding cover may be inclined with respect to the outer circumferential part of the bonding cover by an angle equal to or greater than 90° and less than 180°.

The pack case may include a lower case having an open upper part and an accommodation space therein, and an upper case covering the open upper part of the lower case, and the through hole may be provided at a corner area of the upper case.

The electrode terminal may include a body part fixedly coupled to the through hole, and a protrusion part extending from the body part to protrude to an outer part of the upper case.

The through hole may include a lower hole part having a diameter through which at least the electrode terminal passes, and an upper hole part having a greater diameter than the diameter of the lower hole part.

The bonding part may be provided at the upper hole part of the through hole.

The bonding cover may be shrink-fitted to the body part of the electrode terminal and may cover the upper hole part of the through hole.

The bonding cover may include a plastic material.

The secondary battery pack may further include a terminal cover provided to cover an upper part and a part of a side surface of the electrode terminal, and including a hooking protrusion that is hook-coupled to and released from a stopper included in the pack case to allow the terminal cover to be attachable to/detachable from the pack case.

The electrode terminal may include a positive electrode terminal and a negative electrode terminal.

In another aspect of the present disclosure, there is also provided a vehicle including the above-described secondary battery pack.

Advantageous Effects

According to an aspect of the present disclosure, there is provided a secondary battery pack having an improved sealing property around a through hole of a pack case and an electrode terminal when being compared with the related art. In particular, even when there is a dimensional error of the through hole of the pack case or an assembling error with an electrode terminal, a gap between the through hole of the pack case and the electrode terminal may be completely filled with a bonding part, and is covered by a bonding cover so as to effectively implement sealing of the through hole.

Also, since the through hole of the pack case, the electrode terminal, and the bonding cover are integrally coupled to one another via the bonding part, a position of the electrode terminal may be stably fixed.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
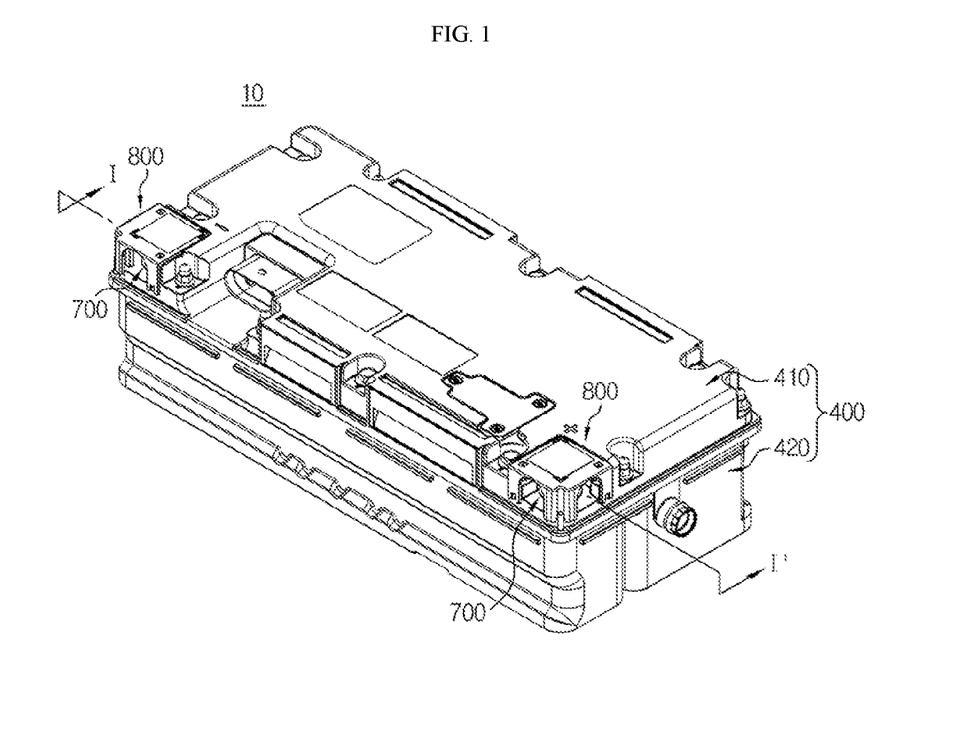
FIG. 1 is an assembled perspective view schematically showing a structure of a secondary battery pack according to an embodiment of the present disclosure.
Figure 2:
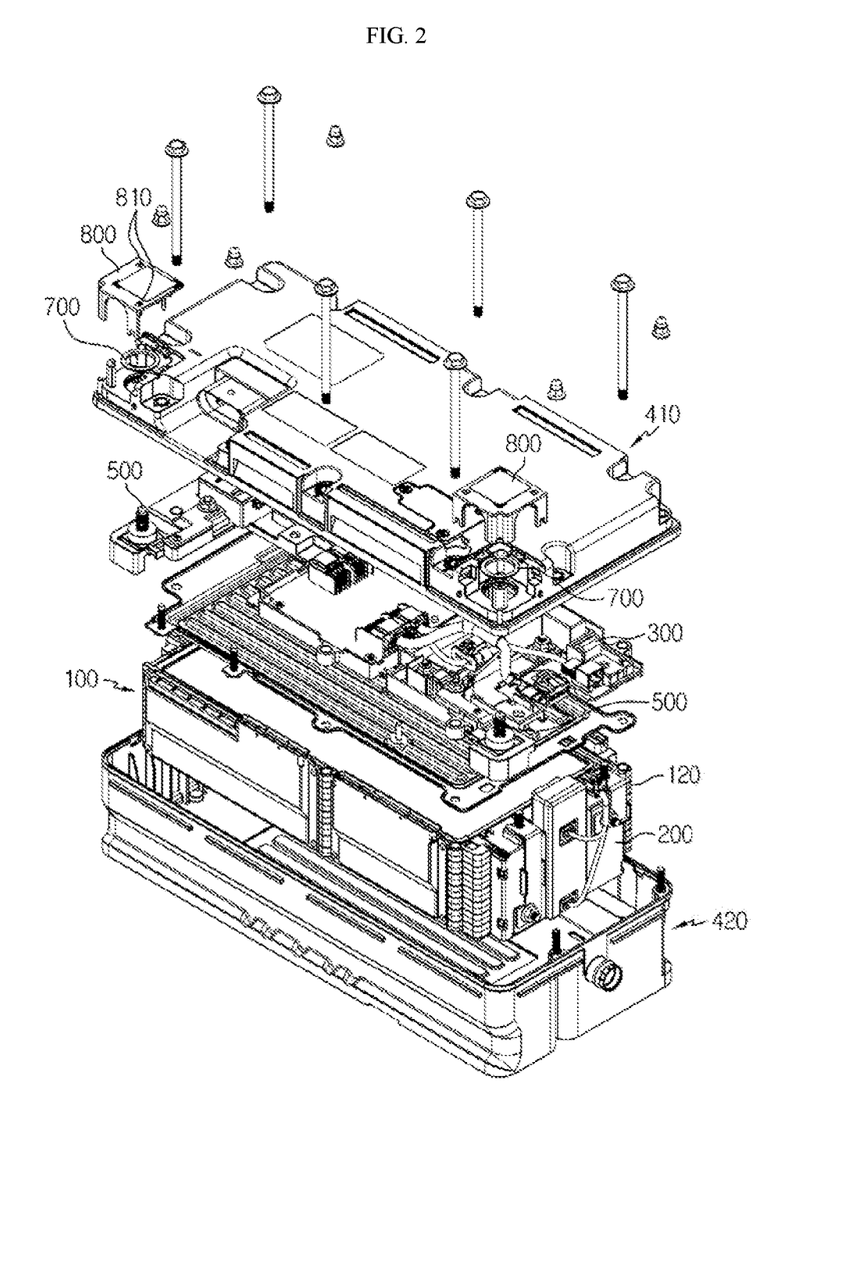
FIG. 2 is a partially exploded perspective view of FIG. 1.
Figure 3:
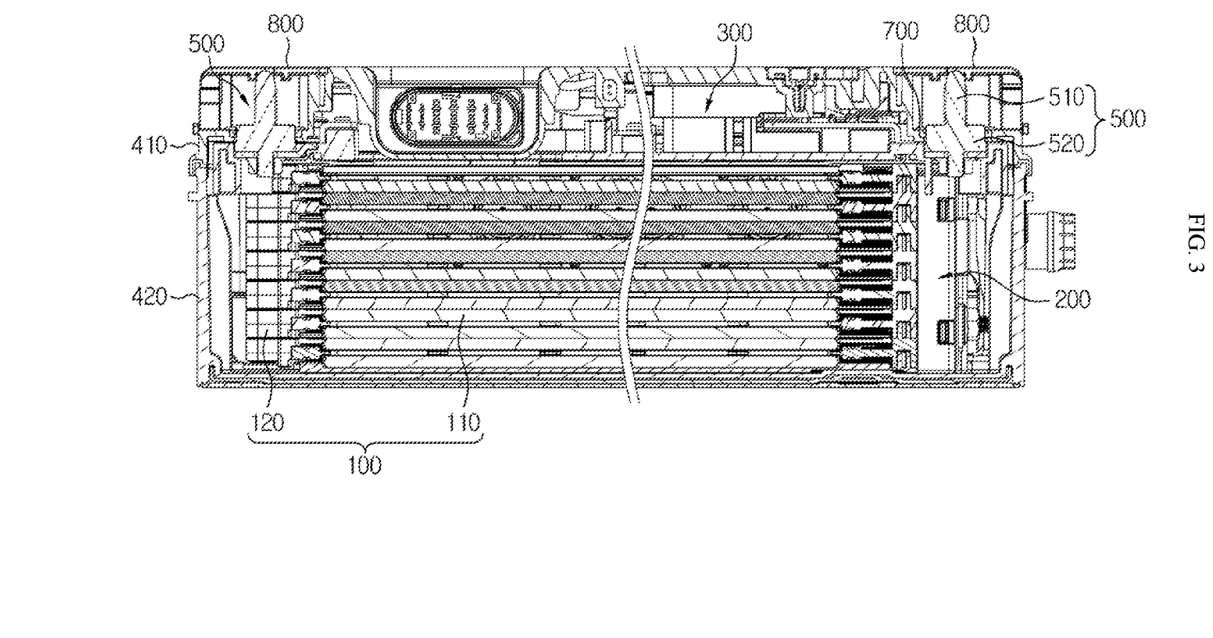
FIG. 3 is a cross-sectional view taken along a line I-I' of FIG. 1.
Figure 4:
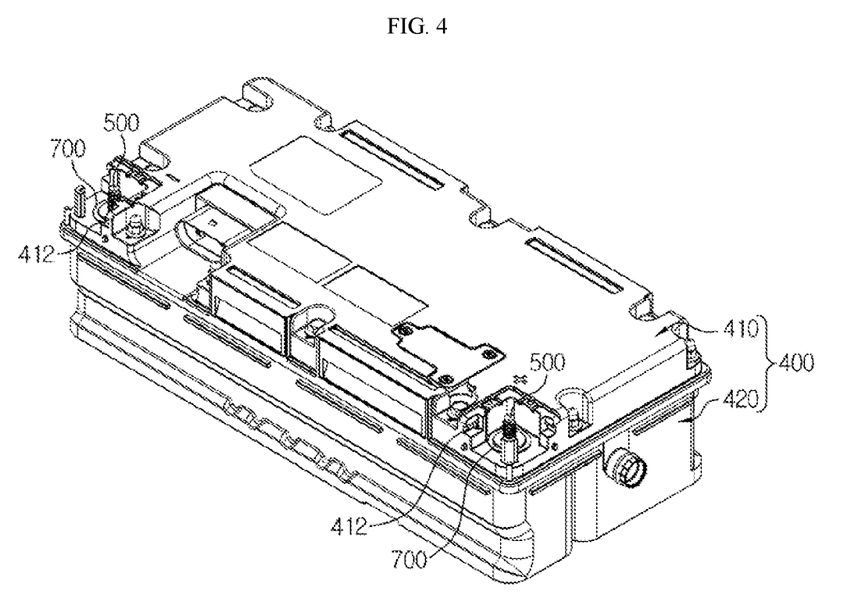
FIG. 4 is a diagram showing a state in which a terminal cover is removed in FIG. 1.

FIG. 1 is a coupled perspective view schematically showing a configuration of a secondary battery pack according to an embodiment of the present disclosure, FIG. 2 is a partially exploded perspective view of FIG. 1, FIG. 3 is a cross-sectional view taken along a line I-I' of FIG. 1, and FIG. 4 is a diagram showing a state in which a terminal cover is removed in FIG. 1.

Referring to FIGS. 1 to 4, a secondary battery pack 10 according to the present disclosure includes a cell assembly 100, a sensing part 200, electrical equipment 300, a pack case 400, and an electrode terminal 500.

First, the cell assembly 100 may include one or more secondary batteries 110, and a stacking frame 120 for accommodating and supporting the one or more secondary batteries 110.

In the secondary battery pack 10, the cell assembly 100 may be an assembly including a plurality of secondary batteries 110. Here, the plurality of secondary batteries 110 may be pouch type secondary batteries 110. In this case, the pouch type secondary batteries may be configured to be stacked in a direction, e.g., in an up-and-down direction.

The stacking frame 120 is an element used to stack and support the secondary batteries 110 and to hold the secondary batteries 110 for preventing the secondary batteries 110 from moving, and is configured to be stackable to guide assembling of the secondary batteries 110. The stacking frame 120 may be expressed in other various terms such as a cartridge, etc., and may be configured as a square ring having empty center portion. In this case, four corners of the stacking frame 120 may be respectively located at a boundary part of the pouch type secondary battery 110.

The sensing part 200 transmits sensing information about electric characteristics such as a voltage of the secondary battery to a device such as BMS. The BMS may control the secondary batteries based on voltage information transmitted from the sensing part 200. The sensing part 200 may be mounted on the stacking frames 120, for example, as shown in FIG. 2, so as to be electrically connected to electrode leads of the plurality of secondary batteries.

The electrical equipment 300 may include at least one of a BMS, a current sensor, a relay, and a fuse. Here, the BMS (battery management system) is a secondary battery management device that controls overall charging/discharging operations of the secondary battery pack 10. The BMS is an element generally included in the secondary battery pack 10. Also, a current sensor is an element for sensing charging/discharging currents of the secondary battery pack 10, and a relay is a switching component for selectively opening/closing charging/discharging current paths through which charging/discharging currents of the secondary battery pack 10 flow. A fuse is provided on the charging/discharging currents of the secondary battery pack 10 and blocks flow of the charging/discharging currents when an abnormal situation occurs in the secondary battery pack 10. The current sensor, the relay, and the fuse may exchange information with the BMS, and may be controlled by the BMS. The above electrical equipment 300 may be arranged on an upper portion of the stacking frames 120.

The pack case 400 includes a hollow space therein to accommodate the cell assembly 100, the sensing part 200, and the electrical equipment 300 in the internal space. The pack case 400 may function as an exterior material of the secondary battery pack 10, and thus, the pack case 200 may provide structural stability to the secondary battery pack 10 and may protect the components such as the cell assembly 100 accommodated therein against external physical elements such as shock, impurities, etc.

In addition, the pack case 400 may include a lower case 420 and an upper case 410, as shown in FIGS. 1 and 2. Here, the lower case 420 may be provided to have an open upper portion and an accommodation space therein, and the upper case 410 may be configured to cover the open upper portion of the lower case 420. In addition, the lower case 420 and the upper case 410 may be coupled to each other when boundaries thereof are coupled to each other via a coupling member such as a bolt.

The electrode terminal 500 is connected to the cell assembly 100 to provide a terminal allowing the cell assembly 100 to be electrically connected to an external device. In more detail, the electrode terminal 500 may be directly or indirectly connected to electrode leads of the secondary batteries included in the cell assembly 100. For example, the electrode terminal 500 may be electrically connected to the electrode lead of the secondary battery via a bus bar.

Also, the electrode terminal 500 may protrude out of the upper case 410, in a state of being connected to the cell assembly 100. Two electrode terminals 500 may be included in the secondary battery pack 10. Here, one electrode terminal 500 may function as a positive electrode terminal and the other electrode terminal 500 may function as a negative electrode terminal. That is, the electrode terminals 500 may include a positive electrode terminal and a negative electrode terminal, and in this case, the positive electrode terminal is connected to a positive electrode lead of the secondary battery included in the cell assembly 100 and the negative electrode terminal may be connected to a negative electrode lead of the secondary battery included in the cell assembly 100.

As shown in FIG. 4, according to the present embodiment, the upper case 410 may have four corner areas, two of which are depressed as squares from an uppermost surface. In addition, a through hole 411 may be formed in each of the two depressed corner areas, to outside and inside directions, that is, in a longitudinal direction in the drawing (see FIG. 7). The electrode terminal 500 is partially exposed above the pack case 400 by passing through the through hole 411 of the upper case 410.

According to the configuration of the present disclosure, when a bus bar or a cable (not shown) is connected to the electrode terminal 500 of the secondary battery pack 10, a connecting operation may be easily performed and a connecting structure may be simplified.

For example, in a case where the secondary battery pack 10 is mounted in an electric vehicle, when the secondary battery pack 10 is repaired or replaced, access to the secondary battery pack 10 may be made downward from an upper portion of the secondary battery pack 10. Here, according to the configuration in which the electrode terminal 500 protrudes upward as in the above embodiment, an operator may easily perform a connecting operation of a cable to the electrode terminal 500 from the upper portion of the secondary battery pack 10.

Figure 5:
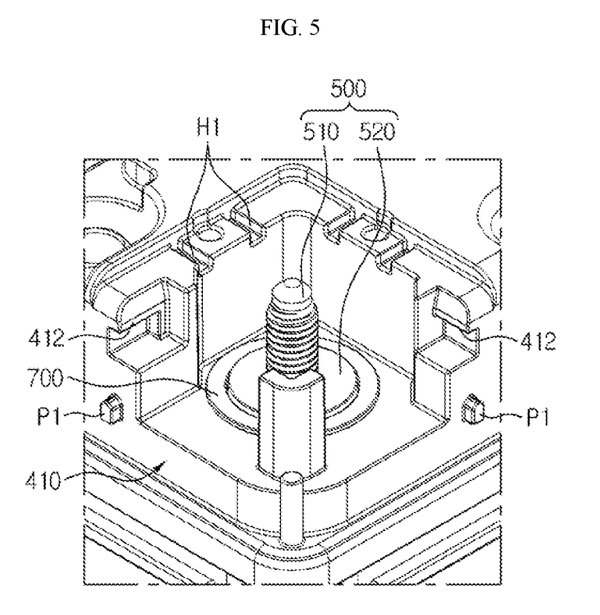
FIGS. 5 and 6 are respectively an enlarged perspective view and a top view of a part A of FIG. 3.
Figure 6:
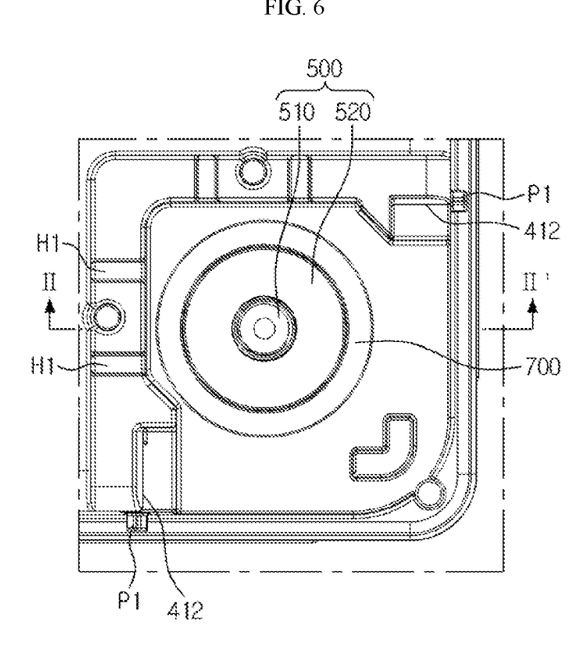
Figure 7:
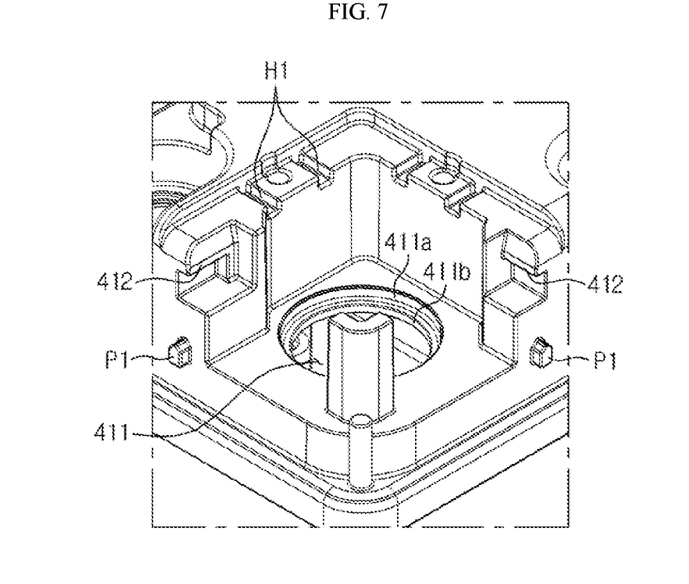
FIG. 7 is a diagram showing a state in which an electrode terminal is removed in FIG. 5.

FIGS. 5 and 6 are an enlarged perspective view and a top view of a part A of FIG. 3, and FIG. 7 is a perspective view showing a state in which an electrode terminal is removed in FIG. 5.

Referring to FIGS. 5 to 7, the electrode terminal 500 includes a body part 520 and a protrusion part 510. Here, the body part 510 may be engaged with the through hole 411 of the upper case 410, and the protrusion part 510 having a smaller diameter than that of the body part 510 extends vertically from the body part 520 to be exposed to outside the upper case 410.

The body part 520 may be manufactured to have a diameter that substantially corresponds to that of the through hole 411, and an upper end surface of the body part 520 may be disposed right above the through hole 411 to be exposed to the outer part of the upper case 410. The upper end surface of the body part 520 may contact a surface of a bus bar or a cable in surface-to-surface contact. In addition, a nut coupling screw thread may be provided on an outer circumferential surface of the protrusion part 510. That is, the protrusion part 510 may be provided as a bolt, to which a nut may be coupled. For example, an operator may insert a bus bar having a through hole at an end portion thereof into the protrusion part 510 of the electrode terminal 500, and then, fastens a nut thereon so that the bus bar may contact the upper end surface of the body part 520 of the electrode terminal 500. In addition, the scope of the present disclosure is not limited to the bolt-type electrode terminal 500 as above. For example, the electrode terminal 500 may be a receptacle type, a snap-fit type, etc.

Figure 8:
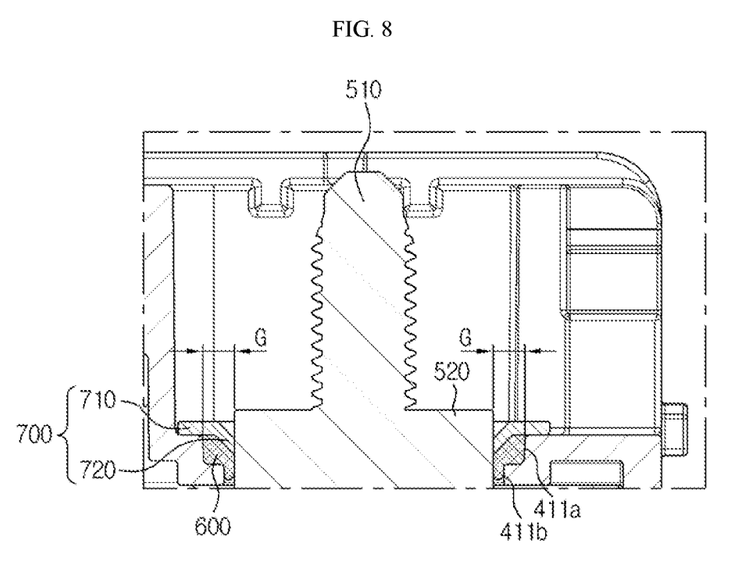
FIG. 8 is a cross-sectional view taken along a line II-II' of FIG. 6.
Figure 9:
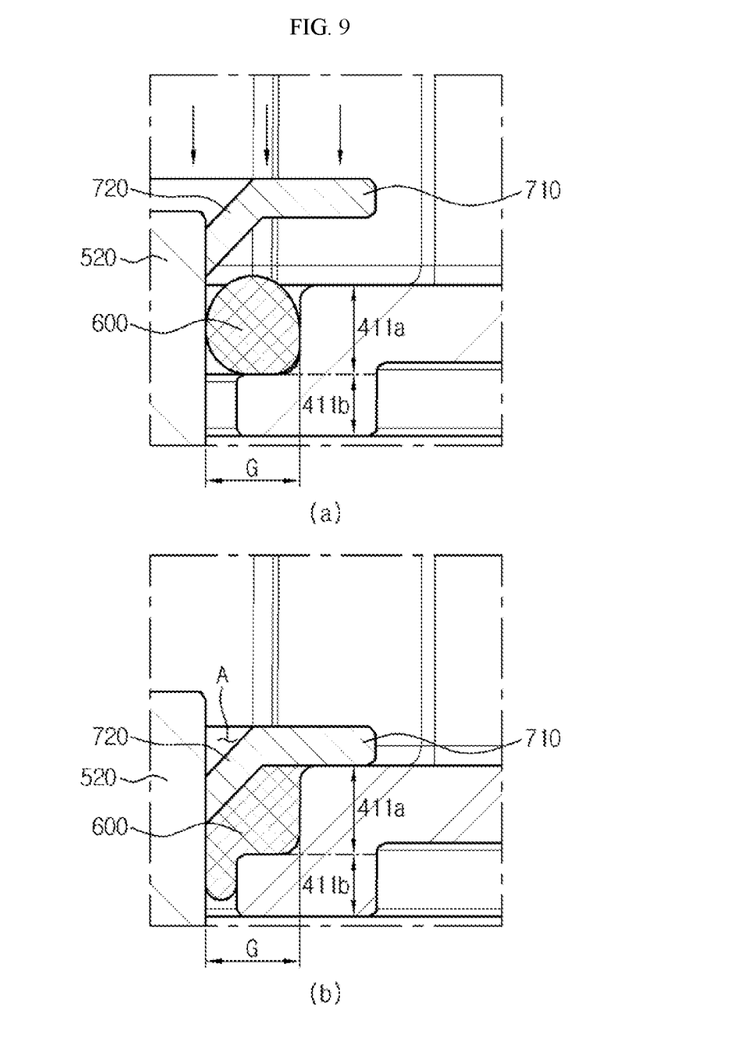
FIG. 9 is a schematic diagram of a sealing process at a connecting portion between a through hole of a pack case and an electrode terminal according to an embodiment of the present disclosure.

FIG. 8 is a cross-sectional view taken along a line II-II' of FIG. 6, and FIG. 9 is a schematic diagram of a sealing process around the through hole of the upper case and the electrode terminal according to an embodiment of the present disclosure.

Hereinafter, a sealing structure between the electrode terminal 500 and the through hole 411 of the upper case 410 will be described below with reference to above drawings.

The secondary battery pack 10 according to the present disclosure may further include a bonding part 600 disposed at a gap between the through hole 411 of the upper case 410 and the electrode terminal 500, and a bonding cover 700 provided to be attached to the through hole 411 of the upper case 410 while surrounding the electrode terminal 500 on an upper part of the bonding part 600.

The bonding part 600 is an element that is filled in a gap G between the through hole 411 and the body part 520 of the electrode terminal 510 to form an adhesive layer, as shown in FIGS. 8 and 9. For example, the bonding part 600 may be an adhesive layer that is formed by continuously applying a sealing adhesive to a contact area between the through hole 411 and the electrode terminal 500 along with a boundary direction. The bonding part 600 fills the gap between the through hole 411 and the electrode terminal 500, and at the same time, tightly fixes the electrode terminal 500 to the through hole 411.

In more detail, the sealing adhesive may be applied in the through hole 411 of the upper case 410, and the through hole 411 of the upper case 410 may include a lower hole part 411*b* and an upper hole part 411*a* having different diameters from each other, as shown in FIGS. 7 and 8. Here, the lower hole part 411*b* has a diameter through which at least the body part 520 of the electrode terminal 500 may pass, and the upper hole part 411*a* may have a greater diameter than that of the lower hole part 411*b*. Preferably, the lower hole part 411*b* and the body part 520 of the electrode terminal 500 may be configured to be shrink-fitted with each other.

When the body part 520 of the electrode terminal 500 is roughly inserted to the lower hole part 411*b* through shrink fit, there may be a predetermined space between a boundary surface of the body part 520 of the electrode terminal 500 and the upper hole part 411*a*, and the sealing adhesive may be applied to the predetermined space, that is, the gap G shown in FIG. 8.

As described above, since the gap G, that is, the gap between the body part 520 of the electrode terminal 500 and the through hole 411, is sealed by the sealing adhesive, infiltration of moisture, other impurities, etc. from an outer part of the pack case 400 may be prevented. Also, since the electrode terminal 500 may be integrally fixed to the through hole 411 by the sealing adhesive, shivering or moving of the electrode terminal 500 may be prevented even with external vibration and shock, to ensure electric stability.

In addition, the bonding cover 700 formed as a loop is provided to be shrink-fitted into the body part 520 of the electrode terminal 500 so as to cover an upper part of the bonding part 600, and the bonding cover 700 prevents leakage of the adhesive out of the through hole 411 and hardens the adhesive to be evenly dispersed in the gap expressed as G in FIG. 7. As a reference, the bonding cover 700 may be arranged on the upper end of the through hole 411 before the sealing adhesive is completely hardened.

The bonding cover 700 may include an outer circumferential part 710 mounted on an upper surface of the upper case 410 at an outer part of the through hole 411, and an inner circumferential part 720 that is shrink-fitted to the electrode terminal 500 to contact a boundary surface of the body part 520 of the electrode terminal 500 and bent downward with respect to the outer circumferential part 710 to be inserted to the through hole 411.

The outer circumferential part 710 of the bonding cover 700 is inserted around the boundary of the electrode terminal 500 to be adhered to the upper surface of the upper case 410 and to cover an open upper part of the upper hole part 411*a*. In addition, when the inner circumferential part 720 of the bonding cover 700 is shrink-fitted to the body part 520 of the electrode terminal 500, the inner circumferential part 720 is inserted to the through hole 411 along the outer circumferential surface of the body part 520 in order to lock the bonding part 600 in the upper hole part 411*a* to the lower hole part 411*b* and to harden the bonding part 600 in order not to generate an air layer in the bonding part 600.

In particular, the inner circumferential part 720 of the bonding cover 700 may be slantingly bent by an angle θ that is equal to or greater than 90° and less than 180° with respect to the outer circumferential part 710. In the present embodiment, the inner circumferential part 720 is bent by about an angle of 120° with respect to the outer circumferential part 710. As described above, if the inner circumferential part 720 of the bonding cover 700 is slantingly bent with respect to the outer circumferential part 710, the gap between the through hole 411 and the electrode terminal 500 may be effectively filled when the bonding part 600 is hardened as being covered by the bonding cover 700.

For example, as shown in (a) of FIG. 9, when the bonding cover 700 of the present embodiment is put on in a state where the bonding part 600 is formed by applying the adhesive on the upper hole part 411*a*, as shown in (b) of FIG. 9, the adhesive of an amount corresponding to a gap A between an upper part of the inner circumferential part 720 of the bonding cover 700 and the electrode terminal 500 may be introduced to the lower hole part 411*b*. In this case, the adhesive may fill the gap between the lower hole part 411*b* and the electrode terminal 500, as well as the gap between the upper hole part 411*a* and the electrode terminal 500, and thus, sealing property of the through hole 411 may be improved.

Also, the bonding cover 700 may be attached to the through hole 411 integrally with the electrode terminal 500 via the bonding part 600. In this case, it may have more efficient electrical stability and coupling force when comparing with a case in which the bonding cover 700 is attached to the corresponding part via a bolt coupling manner or a hooking manner.

The bonding cover 700 may preferably include a plastic material having excellent electric insulating property and heat resistance. However, the scope of the present disclosure is not limited to the bonding cover 700 including the plastic material, for example, the bonding cover 700 may include ceramic, reinforced rubber, etc.

Referring back to FIGS. 1 to 3, the secondary battery pack 10 according to an embodiment may further include a terminal cover 800.

The terminal cover 800 is attachable to/detachable from a corner area of the upper case 410 to cover an upper part and a part of a side surface of the electrode terminal 500 and protect the electrode terminal 500. The terminal cover 800 reduces an exposure of the electrode terminal 500 to outside, and thus, problems caused when a metallic material, for example, contacts the electrode terminal 500, e.g., occurrence of an internal short-circuit, spark, a fire, etc., may be effectively prevented.

Such a terminal cover 800 may include a hooking protrusion that is hook-coupled to a stopper provided at the corner area of the upper case 410. Here, two hooking protrusions may be located at an internal area of the terminal cover 800. The two hooking protrusions are configured to be hook-coupled in different directions from each other.

Therefore, the terminal cover 800 may be separated from the upper case 410 only when the two hooking protrusions are simultaneously released from corresponding stoppers 412. Here, a cover separating jig (not shown) may be used to release the coupling state between the hooking protrusion and the stopper 412, and a jig hole 810 through which the cover separating jig may be inserted from outside to the inside may be provided in an upper plate of the terminal cover 800. The cover separating jig is pushed into the jig hole 810 to escape the hooking protrusion from the stopper 412 to release the hook-coupling state. Next, the terminal cover 800 is vertically lifted in order to be completely detached from the upper case 410.

In addition, according to the present embodiment, at least one protrusion and groove may be formed on the corner area of the upper case 410, on which the terminal cover 800 is mounted, and the terminal cover 800 may include a groove and a protrusion corresponding to shapes of the protrusion and the groove at the corner area of the upper case 410.

For example, as shown in FIGS. 1, 5, and 6, first protrusions P1 protruding towards the side surface of the upper case 410 and second grooves H1 having concavo-convex structures in a longitudinal direction may be provided at the corner area of the upper case 410. In addition, although not shown in detail, the terminal cover 800 may include first grooves engaged with the first protrusions P1 and second protrusions engaged with the second grooves.

According to the above configuration of the present disclosure, when the terminal cover 800 is mounted on the upper case 410, movement of the terminal cover 800 in back and forth, and to left and right may be restricted due to the engagement or concavo-convex coupling structure between the protrusions and the grooves.

In addition, a vehicle according to the present disclosure may include the secondary battery pack 10 according to the present disclosure. The secondary battery pack 10 may be applied to a vehicle such as an electric vehicle or a hybrid car, and moreover, may be also applied to information technology (IT) products.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

On the other hand, it is obvious to one of ordinary skill in the art that the terms used to indicate the direction as described herein, such as 'upper', 'lower', 'right' and 'left', are only for convenience of description, and may be differently expressed depending on a viewing position of a viewer or a location where an object is placed.

What is claimed is:

1. A secondary battery pack comprising:
    a cell assembly comprising a plurality of secondary batteries and a stacking frame supporting the plurality of secondary batteries, the plurality of batteries being stacked in a direction;
    a pack case having an internal space for accommodating the cell assembly, and having a through hole in internal and external directions;
    an electrode terminal electrically connected to the cell assembly and protruding to an outer part of the pack case by passing through the through hole;
    a bonding part filling a gap between the through hole and the electrode terminal to form an adhesive layer; and
    a bonding cover attached to the through hole of the pack case while surrounding a boundary of the electrode terminal above the bonding part, the bonding cover partially extending between the electrode terminal and the bonding part.

2. The secondary battery pack of claim 1, wherein the bonding cover has a loop shape that is shrink-fitted to the electrode terminal.

3. The secondary battery pack of claim 1, wherein the bonding cover comprises an outer circumferential part contacting an upper surface of the pack case at an outer part of the through hole, and an inner circumferential part that is shrink-fitted to the electrode terminal to contact a boundary surface of the electrode terminal and extends downward with respect to the outer circumferential part to be inserted into the through hole.

4. The secondary battery pack of claim 3, wherein the inner circumferential part of the bonding cover is inclined with respect to the outer circumferential part of the bonding cover by an angle equal to or greater than 90° and less than 180°.

5. The secondary battery pack of claim 1, wherein the pack case comprises a lower case having an open upper part and an accommodation space therein, and an upper case covering the open upper part of the lower case, and
    the through hole is provided at a corner area of the upper case.

6. The secondary battery pack of claim 5, wherein the electrode terminal comprises a body part fixedly coupled to the through hole, and a protrusion part extending from the body part to protrude to an outer part of the upper case.

7. The secondary battery pack of claim 5, wherein the through hole comprises a lower hole part having a diameter through which at least the electrode terminal passes, and an upper hole part having a greater diameter than the diameter of the lower hole part.

8. The secondary battery pack of claim 7, wherein the bonding part is provided at the upper hole part of the through hole.

9. The secondary battery pack of claim 8, wherein the bonding cover is shrink-fitted to a body part of the electrode terminal and covers the upper hole part of the through hole.

10. The secondary battery pack of claim 1, wherein the bonding cover comprises a plastic material.

11. The secondary battery pack of claim 1, further comprising a terminal cover provided to cover an upper part and a part of a side surface of the electrode terminal, and comprising a hooking protrusion that is hook-coupled to and released from a stopper included in the pack case to allow the terminal cover to be attachable to/detachable from the pack case.

12. The secondary battery pack of claim 1, wherein the electrode terminal is provided in plurality and includes a positive electrode terminal and a negative electrode terminal.

13. A vehicle comprising the secondary battery pack according to claim 1.

14. The secondary battery pack of claim 1, wherein the electrode terminal includes a vertical surface, and the bonding cover partially extends between the vertical surface of the electrode terminal and the bonding part.

15. The secondary battery pack of claim 1, wherein, in the through hole of the pack case, the bonding cover overlaps the bonding part in both a horizontal direction and a vertical direction.

16. The secondary battery pack of claim 1, wherein, the pack case includes an upper surface, the through hole being formed in the upper surface, and wherein a plane parallel to the upper surface extends through the electrode terminal, the bonding cover, and the bonding part.

* * * * *